April 14, 1931.  F. A. KOLSTER  1,800,455
INDICATOR
Filed June 26, 1925
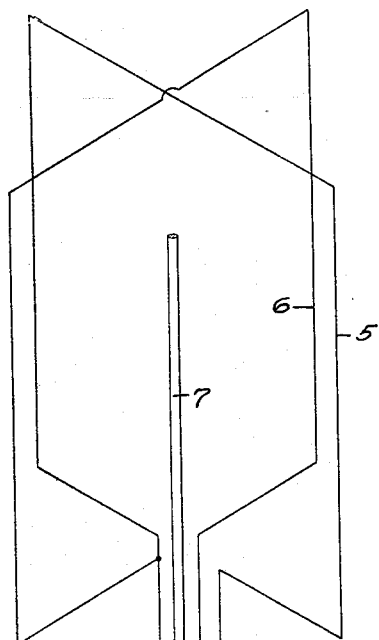
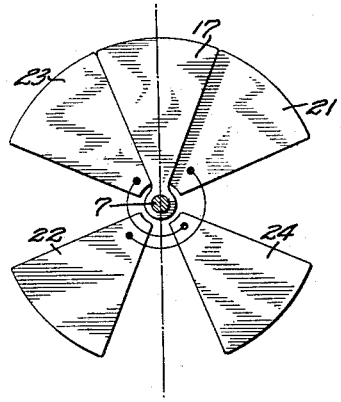
FIG_2_
FIG_1_
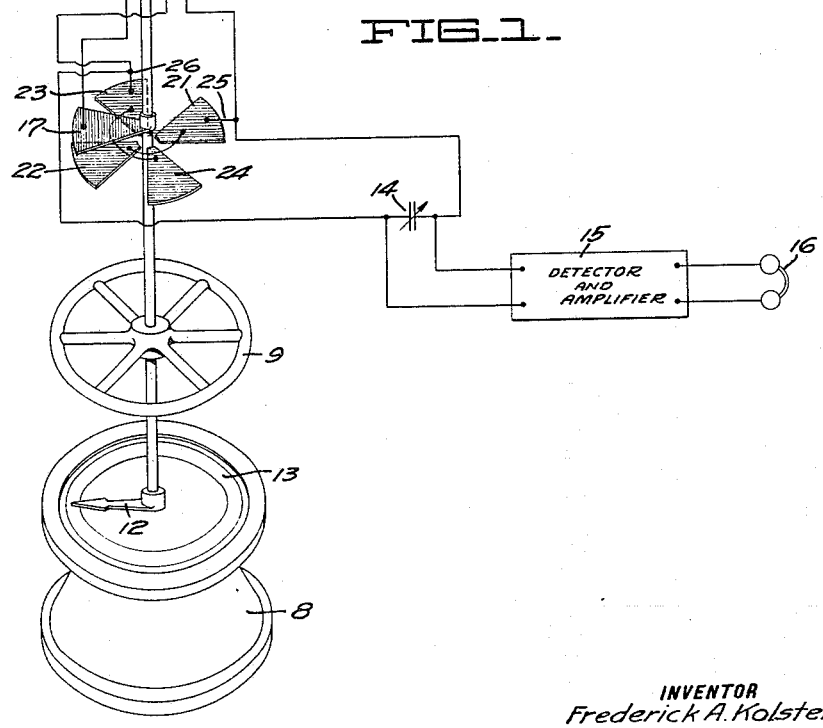
INVENTOR
Frederick A. Kolster.
BY Cornelius D. Ehret
his ATTORNEY Patented Apr. 14, 1931

1,800,455

UNITED STATES PATENT OFFICE

FREDERICK A. KOLSTER, OF PALO ALTO, CALIFORNIA, ASSIGNOR TO FEDERAL TELEGRAPH COMPANY, OF SAN FRANCISCO, CALIFORNIA, A CORPORATION OF CALIFORNIA

INDICATOR

Application filed June 26, 1925. Serial No. 39,872.

The invention relates to an indicator and more particularly to a device for indicating direction, such as a direction finder, the reading of which requires compensation, so that the actual direction of the object to be located may be correctly indicated.

One example where such corrections or compensation is necessary is an ordinary ship's compass. It is well known that to the readings of such a compass about five different corrections must be applied. One of the errors which necessitates these corrections is that due to the magnetic effect of the mass of the ship itself upon the compass needle. This effect is variable with the relative angular position of the needle and the ship; that is, if for example the needle is pointing in the same direction as the ship, a different correction must be made than if the needle is pointing in some other direction, and in general for each angle of deviation between the direction of the ship and that of the needle, different corrections must be applied. It is found that this particular error changes sign for substantially every 90 degrees of variation between the direction of the ship and the direction of the needle.

This invention is particularly applicable to radio compasses used on board ships, in which corrections must be made, due to the metallic mass of the ship. In this case the compass is used to determine the bearing of a source of radiant energy. The waves received from the source by such radio compass are distorted by the metallic mass of the ship, and this distortion is a function of the angle between the longitudinal axis of the ship and the bearing of the source. It is found that in this case also, the errors change sign for substantially every 90 degrees of variation between the direction of the axis of the ship and the bearing of the source of energy. Without the installation of a compensating device, it is found that for many readings of the compass, the apparent direction of the source of energy as indicated by the pointer of the radio compass, is different from the actual direction of the source of energy, this error being caused by the distortion of the radio waves by the metallic mass of the ship. In accordance with my invention, I provide means whereby these errors are compensated for, so that the pointer of the compass always points correctly toward the source of radiant energy.

An object of the invention is to provide means for automatically applying the correction to the pointer or indicator of the compass, so that the pointer or indicator always gives the true bearing of the source of radiant energy.

Another object of the invention is to provide a compensating device in a radio compass, so that the error caused by the distortion of the wave by the metallic mass of the ship is compensated for to cause the compass to read correctly and thereby eliminating the necessity of the application of a correction to the compass reading.

The invention possesses other advantageous features, some of which with the foregoing will be set forth at length in the following description, where I shall outline in full that form of the invention which I have selected for illustration in the drawings accompanying and forming part of the present specification. In said drawings I have shown one form of my invention, but it is to be understood that I do not limit myself to such form, since the invention, as set forth in the claims, may be embodied in a plurality of forms.

Referring to said drawings:

Figure 1 is a perspective diagrammatic representation of a radio compass system embodying my invention.

Figure 2 is a detail of one form of compensating condenser.

The invention is shown as applied to a radio compass which comprises as an essential element, a coil rotatable, as by hand or any other external force, a pointer or sighting hairs connected to the coil so that the position of the pointer is determined by the position of the coil, and a compass card with which the pointer cooperates. The two coils 5 and 6 are connected in series and arranged at right angles to each other. The coils are vertically disposed and are mounted on a vertically disposed rod 7 so that the coils may be rotated together about a vertical axis. In the drawings I have shown each coil as consisiting of one turn of wire, but it is to be understood that the drawing is purely diagrammatic and that each coil consists of a plurality of turns of wire. The rod 7 is suitably supported, as by a base 8, and is rotated by any suitable means, such as the hand wheel 9. Secured to the rod 7 is a pointer 12 which may assume any convenient form, such as sighting hairs, and the pointer 12 cooperates with the compass card 13.

Connected across the terminals of the series coils 5 and 6 is a variable condenser 14 which is used to tune the circuit to the wave length to be received. Connected across the tuning condenser 14 is a detector and amplifier system 15 which is connected to the head phones or signalling device 16. When the series coil is turned about its vertical axis, so that the path of the on-coming wave bisects the angle between the coils, equal and opposite electro motive forces are induced in the two coils so that no energy is delivered to the detector and amplifier and consequently no signal is produced in the translating device 16. Consequently, when it is desired to find the bearing of a source of radiant energy, the coil is rotated until the signal disappears in the translating device 16 and, when this occurs, the pointer 12 will point toward the source. Due to the metallic mass of the ship, however, there is a distortion of the wave front of the on-coming wave so that the path of the wave as it reaches the compass is distorted from its true path of travel and means are provided for correcting for this distortion, so that the pointer 12 will always point directly toward the source. Due to this distortion, when the coil is positioned so that the line bisecting the angle of the two coils points directly toward the source of radiant energy, a greater electro motive force is induced in one coil than is induced in the other and means are provided for varying the electrical factors of the coil circuit so that this error is compensated for. In the present instance this is accomplished by arranging a variable condenser in the coil circuit, the movable plate of which is secured to the rod 7, so that the capacity of the condenser varies with different settings of the coils, and, the shape and size of the plates of the condenser are so made that for the installation on a particular ship the variation in capacity exactly counterbalances the variation in electro motive force caused by the distortion of the waves, so that a true reading is obtained. The distortion on different ships is different and, when the compass is installed, the compensating condenser is calibrated to suit the conditions existing in that particular installation.

I have found that when the source of radiant energy is directly ahead or directly astern of the ship, that is, if it lies in the prolonged longitudinal axis of the ship, no compensation is necessary, since there is no distortion of the waves. I have also found that if the source of radiant energy lies directly abeam or at right angles to the longitudinal axis of the ship, there is no distortion and no requirement for correction. Correction is required for all positions intermediate the positions mentioned. The magnitude of these corrections may be plotted as a sine curve which curve crosses the base line every 90 degrees, so that for each successive 90 degrees, the sign of the correction is reversed. That is, for the 90 degrees between straight-ahead and straight-abeam, the correction may be positive, and for the 90 degrees between straight-abeam and straight-astern, the correction will be the reverse, or negative.

The error due to distortion is compensated for by the introduction of a condenser in the coil circuit between the coil and the variable condenser 14. This condenser preferably comprises a plate or series of plates 17, secured to and rotatable with the rod 7, which plates cooperate with a plurality of pairs of plates or pairs of series of plates 21—22 and 23—24. The condenser plates 21—22 are connected together and the condenser plates 23—24 are connected together. One of the pairs of condenser plates 21—22 is connected to one side of the loop or coil circuit by the conductor 25 and the other pair of condenser plates 23—24 is connected to the other side of the loop or coil circuit by the conductor 26. The condenser plate 17 is connected to the two series coils at their point of juncture, so that the condenser consists in effect of two condensers arrranged in series across the series coil circuit, there being one condenser in series in each coil. As the rod 7 is rotated the capacity of one or the other of the condensers is varied and this variation is such that it exactly counterbalances the error which is tended to be produced in the coils by the distortion of the wave front. The condenser which is actuated by the rotation of the rod 7 is designed to have no effect on the tuning of the circuit and gives perfect correction or compensation for one selected wave length. For other wave lengths the condenser must be adjusted, so that its capacity is increased approximately in proportion to the increase of capacity of the tuning condenser. Adjustment of the tuning condenser 14 varies the capacity of the circuit and the correcting capacity must be varied in the same direction to establish the required balance and produce perfect correction.

The stationary condenser plates 21, 22, 23 and 24 are shown sector shape and are spaced apart regularly around the rod 7 and the movable plate 17 is shown sector shape and of the same width as the fixed plate, so that it may move into and out of registry with the fixed plates. The fixed plates are preferably arranged so that the longitudinal axis of the ship will bisect the angle formed by two adjacent plates, so that when the source of radiant energy is directly ahead, the movable plate 17 will lie intermediate two of the fixed plates. The movable plate 17 is preferably alined with the pointer 12, so that the pointer will indicate the actual correct bearing of the source of radiant energy. By the use of this device the error which is tended to be produced by the distortion of the wave front is compensated for so that the pointer always points directly toward the source of radiant energy, thereby eliminating the requirement of applying corrections to the reading of the pointer.

I claim:—

1. Radio direction-finding apparatus comprising an electrical system having a non-uniform directional characteristic, a member comprised in said electrical system movable to positions related to the directions of sources of electro-radiant energy, a direction indicating member movable in fixed relation therewith, and a correction device comprising circuit members of said system movable relatively to each other and upon whose relative positions depends the position of said indicating member when in direction indicating position.

2. Radio direction-finding apparatus comprising an electrical system having a non-uniform directional characteristic, a member comprised in said electrical system movable to positions related to the directions of sources of electro-radiant energy, a direction indicating device and means for automatically varying the electrical factors of the system to compensate for wave front distortion for different positions of said movable member.

3. Radio direction-finding apparatus comprising an electrical system having a non-uniform directional characteristic, a member comprised in said electrical system movable to positions related to the directions of sources of electro-radiant energy, a direction indicating device and a condenser in said system, the capacity of which is varied by movement of said member to different positions to compensate for wave front distortion.

4. Radio direction-finding apparatus comprising an electrical system having a non-uniform directional characteristic, a member comprised in said electrical system movable to positions related to the directions of sources of electro-radiant energy, a direction indicating device, means connecting said member and said device, and a condenser in said system, the movable plate of which is movable with said means to vary the electrical factors of the system as the member is moved to different positions.

5. Radio direction-finding apparatus comprising an electrical system having a non-uniform directional characteristic, a member comprised in said electrical system movable to positions related to the directions of sources of electro-radiant energy, a direction indicating device, and means for varying an electrical factor of the system to unbalance the system to compensate for the error in position of the member due to wave front distortion.

6. Radio direction-finding apparatus comprising a rotatable coil adapted to be turned toward a source of electro-radiant energy, a rotatable indicator connected to said coil and means actuated by the rotation of the coil for varying the electrical factors of the coil circuit to compensate for wave front distortion, so that the coil actually points toward the said source when apparently pointing toward said source.

7. Radio direction-finding apparatus comprising two coils connected in series and rotatably mounted so that they may be turned toward a source of electro-radiant energy and means actuated by the rotation of said coils for varying the capacity of one coil circuit with respect to the other.

8. Radio direction-finding apparatus comprising two coils connected in series and rotatably mounted so that they may be turned toward a source of electro-radiant energy, a condenser connected across each coil, there being one plate common to both condensers and means connecting said plate to the coils for rotation therewith.

9. In combination with a body affecting the apparent direction of propagation of electro-radiant energy, an electrical system having a non-uniform directional characteristic, a member comprised in said electrical system movable to position related to a source of said energy, and means operated by and in accordance with movement of said member to vary the effect of said energy upon said member to compensate for the distorting effect of said body on the wave-front thereof, whereby the member takes a position corresponding with the true direction of said source.

10. A radio compass comprising a coil adapted to be moved to position related to the bearing of a source of electro-radiant energy, a direction indicator, and an impedance in circuit with said coil whose effective magnitude is varied by and in accordance with rotation of said coil to compensate for wave-front distortion, whereby said indicator takes a position corresponding with the true direction of said source of electro-radiant energy.

11. In a radio compass, a rotatable member adapted to be turned towards a source of electro-magnetic radiation, an indicator movable to equal extents for equal extents of movement of said member, and a compensating device interposed between the member and the indicator, whereby the indicator takes a position corresponding with the true direction of said source.

12. Radio direction-finding apparatus comprising two coils serially connected and mounted in angular relation for rotation to position related to a source of electro-radiant energy, and complementarily adjustable impedances in shunt thereto whose effective magnitudes are varied by rotation of said coil to correct for wave-front distortion of said energy.

13. Radio direction-finding apparatus comprising a coil adapted to be removed to position related to the bearing of a source of electro-radiant energy, and an impedance in circuit with said coil whose effective magnitude is varied by and in accordance with rotation of said coil to compensate for wave-front distortion, whereby said coil takes for a critical response a position corresponding with the true direction of said source of electro-radiant energy.

14. A radio compass comprising a rotatable member adapted to be turned to position related to the direction of a source of electro-radiant energy, an indicator movable in fixed relation therewith, and a device electrically to compensate for wave front distortion, whereby said indicator and said member take a position corresponding with the true direction of said source of electro-radiant energy.

In testimony whereof, I have hereunto set my hand.

FREDERICK A. KOLSTER.